United States Patent
Lagow et al.

[11] 3,904,501
[45] Sept. 9, 1975

[54] FLUORINE PLASMA SYNTHESIS FOR CARBON MONOFLUORIDES

[75] Inventors: Richard J. Lagow, Manchester; Raymond F. Baddour, Belmont; David K. Lam; Lawrence A. Shimp, both of Cambridge, all of Mass.

[73] Assignee: Massachusetts Institute of Technology, Cambridge, Mass.

[22] Filed: Oct. 4, 1973

[21] Appl. No.: 403,362

[52] U.S. Cl. ............... 204/164; 423/439; 423/489
[51] Int. Cl.[2].. B01K 1/00; C01B 31/30; C01B 9/08
[58] Field of Search...... 204/157.1 R, 164; 423/439, 423/489

[56] References Cited
UNITED STATES PATENTS

| | | | |
|---|---|---|---|
| 3,255,099 | 6/1966 | Wolinski | 204/169 |
| 3,674,432 | 7/1972 | Margrave et al. | 423/439 |
| 3,745,104 | 7/1973 | Hou | 204/165 |

*Primary Examiner*—Howard S. Williams
*Attorney, Agent, or Firm*—Arthur A. Smith, Jr.; Martin M. Santa; David E. Brook

[57] ABSTRACT

A new preparation for carbon monofluorides, including those species having superstoichiometric ratios of fluorine to carbon, is disclosed. In the synthesis, graphitized carbon can be used as a source of carbon and fluorine plasma is used as a source of activated fluorine atoms. The reaction is conveniently carried out by suspending graphite flakes in a flow of fluorine gas within a fluidized bed reactor, and by applying a radio frequency field across the reactor to produce fluorine plasma.

Various carbon monofluorides are produced including carbon monofluorides having superstoichiometric fluorine to carbon ratios. Carbon monofluorides are known to be useful as solid lubricants under extreme environmental conditions, and as cathode materials in high energy batteries.

12 Claims, 2 Drawing Figures

● C  ○ F

FLUORINE PLASMA SYNTHESIS FOR CARBON MONOFLUORIDES

The invention described herein was made in the course of or under a grant from the National Science Foundation, an agency of the U.S. Government.

BACKGROUND OF THE INVENTION

1. Field of the Invention

This invention relates to a method for preparing carbon monofluorides, and more particularly to a method for preparing carbon monofluorides utilizing a fluorine plasma.

2. Description of the Prior Art

Carbon monofluorides or graphite monofluorides, or even more properly poly(carbon monofluorides), are known compounds which can be represented by the empirical formula $(CF_x)_n$. For purposes of simplification, the term "carbon monofluoride" will be used herein.

An early carbon monofluoride, which was gray in color and had an empirical formula of $CF_{0.92}$, was reported by Ruff et al. in Z. Anorg. Allg. Chem. 217, 1 (1934). Later investigators reported a series of compositions ranging from a black variety of empirical formula $CF_{0.68}$ through gray to white species in the case of $CF_{0.995}$. Typical syntheses for these carbon monofluorides included passing fluorine over graphite at 450°–600°C. for several hours, and sometimes using hydrogen fluoride as a catalyst. Carbon monofluorides prepared by these syntheses were noted for their lack of reproducibility. See, Ruff et al., Z. Anorg. Allg. Chem. 217, 1 (1934); Rudorff et al., Z. Anorg. Allg. Chem. 253, 281 (1947); and Hennig, Progress in Inorganic Chemistry, F. A. Cotton, ed., vol. I, Interscience Publishers, 1959, p. 125.

For many years, it was thought that the maximum fluorine to carbon ratio in carbon monofluorides was the stoichiometric ratio of 1.0. It has more recently been found, however, that superstoichiometric fluorine to carbon ratios can be prepared. See Margrave et al., U.S. Pat. No. 3,674,432. In superstoichiometric carbon monofluoride, it is postulated that two fluorine atoms are attached to each of the edge carbon atoms in the axial and equatorial positions in a graphite-like crystalline structure. This would account for the fluorine to carbon ratios being greater than 1.0.

The Margrave et al. patent discloses at least two techniques for producing superstoichiometric carbon monofluorides. In the first synthesis, which is carried out at atmospheric pressure, stable carbon monofluorides having superstoichiometric fluorine to carbon ratios of up to 1.12 can be prepared by contacting graphite with fluorine gas at temperatures in the range of 624°–630°C., and by maintaining the temperature to within ±3°C. The second synthesis is carried out in a bomb reactor at superatmospheric pressures in the range of 225–250 psia; this synthesis does not require the addition of external heat. Both syntheses described in the Margrave et al. patent are difficult to control. Extreme temperature control is required in the first, and this is exceptionally difficult in large zones at the operating temperature because temperature gradients develop very easily. The second synthesis requires control of very large pressures, and the reactions border on the verge of explosions.

Despite the problems inherent in these syntheses for superstoichiometric carbon monofluorides, there is little doubt about the many desirable properties of the product produced. Superstoichiometric carbon monofluoride is exceptionally thermally stable and chemically inert. For example, tests have indicated that such materials are stable at temperatures up to 600°C. for indefinite times, up to 800°C. for short periods, and up to pressures of 725,450 psia. Also, although its coefficient of friction is similar to that of graphite, its wear and load carrying capacity is much greater. Because of these and other properties, superstoichiometric carbon monofluorides have proved to be excellent solid lubricants under extreme conditions such as high or low temperatures, high pressures, heavy loads, and in fact are felt to be much superior to existing lubricants such as graphite or molybdenum disulfide. Additionally, superstoichiometric carbon monofluoride can be used as a cathode material in high energy batteries.

It would be desirable, therefore, to have new syntheses for carbon monofluorides, including the superstoichiometric species, which required less control, could be carried out at lower temperatures and pressures, which required lower amounts of power, and which yielded reproducible products.

SUMMARY OF THE INVENTION

This invention relates to a new preparation for carbon monofluorides. In this synthesis, fluorine plasma is used as a source of activated fluorine atoms. A high degree of dissociation of fluorine atoms can be achieved under appropriate plasma conditions and the likelihood of electronically excited fluorine atoms is high. The fluorine plasma is passed across a suitable source of carbon, such as graphite flakes, to produce carbon monofluorides at much lower temperatures and/or pressures than was heretofore possible. Superstoichiometric fluorine to carbon ratios are achieved using this synthesis.

A convenient way to carry out the synthesis is to suspend graphitized carbon in a flow of fluorine gas within a fluidized bed reactor. The system is evacuated to very low pressures and the fluorine plasma is created by applying a radio frequency field to the fluorine or by using other suitable power sources. Using this technique, carbon monofluorides having empirical formulas of up to $CF_{1.19 \pm 0.4}$ can be prepared.

In the synthesis described herein, relatively low temperatures are used, particularly when contrasted with the high temperature syntheses of the prior art. A typical fluorine plasma temperature is, for example, 150°C. Smaller amounts of power are required than in the high temperature syntheses, which results in considerable savings in energy. Additionally, because of the nature of the plasma synthesis, a continuous process is possible which was not possible with the prior art high temperature or high pressure syntheses.

DESCRIPTION OF PREFERRED EMBODIMENTS

Figure 1:
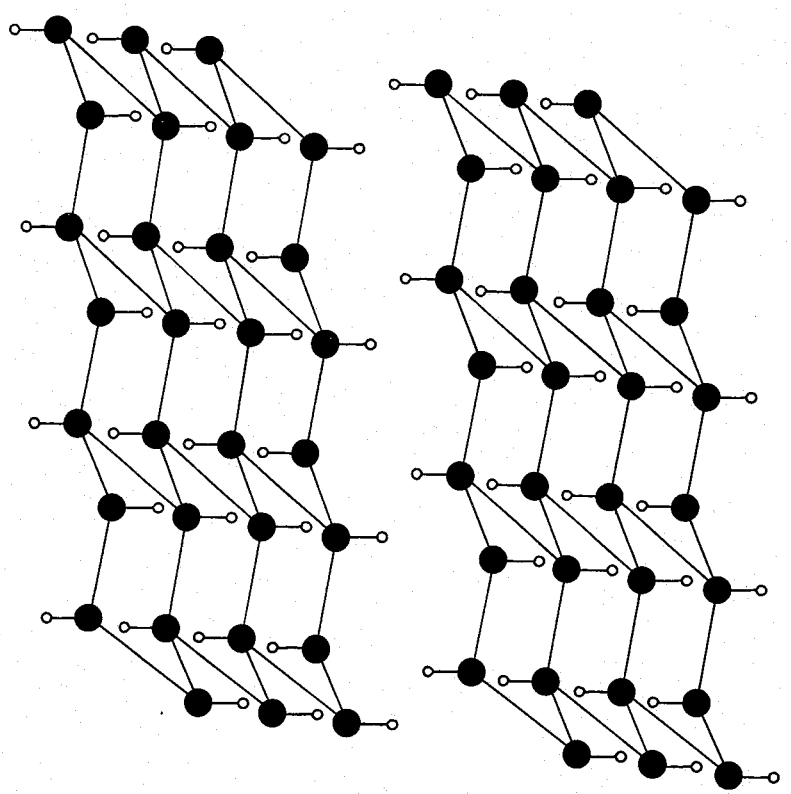
FIG. 1 illustrates a proposed chemical structure for carbon monofluorides such as those prepared according to this invention.

The structure of carbon monofluorides, including superstoichiometric species, can be more readily understood by referring to FIG. 1. The structure illustrated therein has been proposed for carbon monofluorides. See Rudorff et al., Chem. Ber., 80, 417 (1947). Interplanar spacing is 6.6 A. This structure is believed to be approximately correct except for the layer stacking and the fact that the carbon atoms on the edges of each layer are divalent and therefore have both axial and equatorial fluorine. See Bautista, Bonnell and Margrave, "The Structure of Carbon Monofluoride," (to be submitted for publication). It can be determined by examining the fluorine to carbon ratio of the most highly fluorinated graphite that superstoichiometric ratios are a result of the axial and equatorial fluorines. The exact stoichiometry varies with particle size. Therefore, only the snow white carbon monofluorides with fluorine to carbon ratios greater than one lack the fluorine site deficiencies characteristic of the earlier preparations.

Carbon monofluorides can be produced, according to this invention, from activated fluorine atoms and carbon. Those forms of carbon having some graphitic structural characteristics, such as graphitic carbon black are preferred. Graphite, as the term is normally used, is a crystalline allotropic form of carbon characterized by a hexagonal arrangement of the atoms. Since practically all forms of carbon have some graphitic structural characteristics, and thus can be used in accordance with this invention, the term carbon will be used to describe the general class of materials that can be reacted with activated fluorine atoms to form carbon monofluorides. However, the most efficient conversion of carbon and fluorine to carbon monofluorides occurs when graphite or those forms or carbon exhibiting strong graphitic structural characteristics are used. Also, included within the definition of the term carbon are all physical forms of carbon, including particulate carbon, carbon fibers and filaments, and varous shapes of solid carbon, such as rods, spheres, plates, gaskets and hollow cylinders. Those forms exhibiting relatively large surface areas per unit mass, such as flakes, are preferred.

Fluorine gas is used as the source of activated fluorine atoms. Preferably the fluorine gas has a high purity to maximize the yield of activated fluorine atoms; impurities, of course, cause lower yields. The fluorine gas can be mixed, however, with other inert gases such as argon, neon, helium, etc. Preferably, amounts of inert gases of about 10–100% are used; higher amounts can be used, if a slowing of the reaction rate is not objectionable. The inert gases are believed to make the recombination path of activated fluorine atoms longer, thereby increasing their life.

Activated fluorine is used with this synthesis, and generally includes electronically excited fluorine atoms or vibrationally excited molecular fluorine. A low energy fluorine plasma, which is a gaseous mixture of fluorine atoms and electrons which emits visible radiation, can be produced by any known method. One method is to use a corona discharge at pressures up to about one atmosphere. A second method is to use a microwave discharge at lower pressures. The preferred method is to use a glow discharge such as can be created using very low pressures (e.g., below 5 mm Hg) and applying radio frequency waves across a flow of elemental fluorine gas, the r-f waves being generated by a low power radio frequency generator. With glow discharges, gas temperatures up to about 640°C. can be used, and it is preferred to have gas temperatures in the range of about 100°–150°C. Temperatures above about 640°C. have been found to result in degradation of the graphite structure and to produce carbon tetrafluoride instead of carbon monofluorides. Known techniques for generating activated fluorine atoms using fluorine plasmas are described in the following references, the teachings of which are hereby incorporated by reference: *Plasma Chemistry*, ed. R. F. Baddour, MIT Press (1967); *Plasma Chemistry in Electrical Discharges*, F. K. McTaggart, Elsevier Publishing Co., New York (1967); *Reactions Under Plasma Conditions;* vol. 1, ed. M. Venugopalan, Wiley Interscience, New York (1971).

Maximum contact between the activated fluorine and carbon is desirable. One suitable method for achieving this comprises suspending carbon particles in the flow of fluorine gas in a fluidized bed reactor while applying a radio frequency field across the reaction zone to produce the required plasma. Other methods of contact are, however, perfectly suitable. The time required for production of the carbon monofluorides described herein will depend upon many factors including the amount of carbon, form of carbon, fluorine gas flow rate, plasma temperature, etc. Those skilled in the art will be able to determine suitable reaction times following the teachings of the examples presented infra and by using no more than routine experimentation.

In general, the carbon monofluorides produced have the same properties of those previously known. The super-stoichiometric carbon monofluorides produced have a snow white color and are powdery in nature. Their infrared spectra and X-ray powder patterns conform to those previously reported for superstoichiometric carbon monofluorides. Elemental analysis establishes that fluorine to carbon ratios of up to about 1.19 can be produced using the fluorine plasma technique described herein.

Figure 2:
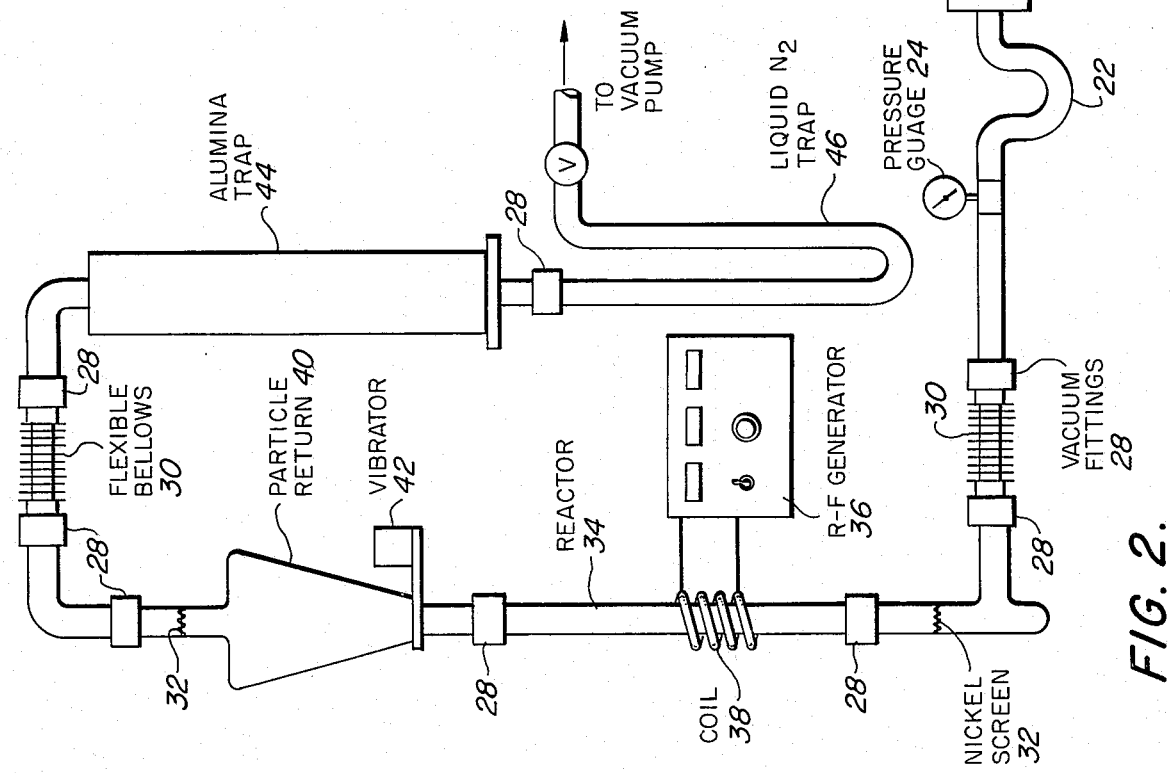
FIG. 2 illustrates a fluidized bed reactor suitable for carrying out the synthesis of carbon monofluorides according to this invention.

A fluidized bed reactor suitable for preparing carbon monofluorides according to this invention is illustrated in FIG. 2. Fluorine gas is introduced from cylinder 12 by opening valve 14. Flow control means 16, which may be for example a flow monitoring transducer such as a Hastings-Raydist Model LF50M transducer, is connected to a needle valve 18. A sodium fluoride trap 20 is used to remove hydrogen fluoride from the system, and other traps such as a −78° copper U-trap 22 can be used to remove any remaining traces of hydrogen fluoride. Internal pressure is measured by pressure gauge 24. Vacuum fittings 28 are used throughout to insure pressure tight seals in the system. Maintenance of good vacuum and dry conditions are essential for production of fluorine plasma. All glass in the system must be fluorine resistant, and could be, for example, Vycor. Stainless steel flexible bellows 30 are used to provide for expansion and contraction in the system.

Screens 32, such as 150 mesh nickel screens, are used to support and contain graphite particles above and below reactor 34. The screens 32 can be held in place by Teflon washers. The reactor 34 is formed from fluorine resistant material, and 1-inch O/D. alumina tube is suitable. Material selection is important since most materials will not withstand a fluorine plasma for significant amounts of time.

A power supply such as radio frequency generator 36 is connected to copper coils 38 to apply a suitable activating field across the reactor 34. A particle return 40 is provided, which can be a Vycor erlenmeyer flask. A vibrator 42, connected to an electrical circuit which is pulsed to provide periodic vibrations, can be used to prevent graphite from adhering to the walls. A particle trap which can be the aforementioned upper screen 32, is inserted after the particle return 40 to catch the fine white carbon monofluoride powder produced. Unreacted fluorine can be removed from the effluent gases with an alumina trap 44 which can be formed from 8–14 mesh carrying activated alumina. Finally, a liquid nitrogen trap 46 can be used to protect the vacuum pump from attack.

Those skilled in the art will recognize many modifications and/or equivalents to the preferred embodiments described herein. These are intended to be encompassed within the following claims.

EXAMPLE 1

An apparatus as illustrated in FIG. 2 was used. Fluorine flow was monitored with a Hastings-Raydist Model LF50M transducer, and was controlled with a Monel needle valve. A sodium fluoride trap, placed after the needle valve, was used to remove hydrogen fluoride from the fluorine and a $-78°$ copper U-trap was used to remove the last traces of hydrogen fluoride passing the sodium fluoride trap. Internal pressure was measured with a Hastings Model Sp-1 vacuum thermocouple gauge which was isolated with a Monel valve not depicted in FIG. 2. Cajon 1 inch Ultra Torr fittings were used as couplings at all connections, and Viton O-rings which were coated with Fluorolube stopcock grease were used as seals. The Cajon couplings above and below the reactor were water cooled by soldering a piece of ¼ inch copper tubing to them and passing water through the tubing to keep the O-rings cool. Cajon stainless steel flexible bellows were placed on either side of the reactor. Glass items in the system were fabricated of Vycor. Nickel screens (150 mesh) were used to support and contain the graphite particles within the reactor. These screens were held in place with Teflon washers.

The reactor used was a 1 inch o.d. alumina ($Al_2O_3$) tube. Alumina was used since it has been found that even quartz tubes will not withstand a fluorine plasma for more than several hours. A five-turn ¼ inch copper coil was used in conjunction with a 2 kilowatt Raybond radio frequency generator to provide fluorine plasma generation capability. A 20 megahertz operating frequency was selected. A particle return was fabricated from a Vycor erlenmeyer flask and a vibrator was used to prevent graphite particles from adhering to the walls. The vibrator was connected to an electrical circuit which pulsed the vibrations periodically. A particle trap was inserted after the particle return to catch the fine white carbon monofluoride powder produced. The distance between the lower screen and lower coupling was 5 cm.; between the lower reactor coupling and upper reactor coupling was 30 cm.; and between the upper reactor coupling and top screen was 25 cm. Unreacted fluorine was removed from the effluent gases with an alumina trap (8–14 mesh, activated alumina, $Al_2O_3 + F_2 \rightarrow 2AlF_3 + 3/2 O_2$), and a liquid nitrogen trap was used to protect the vacuum pump which was attached at the exit of the apparatus.

Flake graphite (60 mesh 99%) was chosen as a starting material to facilitate particle fluidization and minimize particle losses. About 1 gram of flake graphite was placed on the lower nickel screen, and the system was then sealed and evacuated to at least 0.1 millimeter of mercury. The alumina must be dry or such vacuum is not possible. A fluorine flow of 30 cm³/min was introduced into the system and the pumping speed was adjusted to give an internal pressure of 2–5 mm. of mercury. The fluorine used was 98% pure. The fluorine flow fluidized the graphite particles between the upper and lower nickel screens; fluidized particles were returned with the aid of the vibrator by sliding down the walls of the particle return. Thus, the particles passed continually through the plasma reactor to ensure maximum surface contact with the plasma. The water flow in the Cajon joints above and below the reactor was then initiated, and the radio frequency generator was activated at a power output of 480 watts. This value was obtained by measuring the voltage across the coil and the current between the blocking and tank capacitors. A highly reactive fluorine plasma was produced as power was applied which was brilliant pink and turned to violet if any air leaks were present. The particles were allowed to be fluidized through the plasma for a 12-hour period. As carbon monofluoride formation occurred, breakup of the graphite flakes was observed. Some of the snow white powder of stoichiometry $CF_{1.1}$ was formed was deposited on the upper part of the erlenmeyer particle return, and the majority of this carbon monofluoride passed through the upper screen into the particle trap. After 12 hours, the plasma was terminated, the reactor was dismantled, and the white carbon monofluoride was removed from the particle trap and the uppermost walls of the particle return.

The amount of snow white carbon monofluoride produced was 0.1–0.3 grams. The material remaining on the lower nickel screen was found to be carbon monofluoride of lower stoichiometry, i.e., about $CF_{0.68}$ as determined by its infrared spectra and X-ray powder pattern. Infrared spectra were obtained with a Beckman IR-20A spectrometer using KBr disk samples. Powder pattern X-rays were obtained on a Philips Electronics Model 12045B/3 X-ray generator using type 520 56/0 powder cameras. Copper (1.5405 A) radiation was used in all X-ray spectra.

The total yield of carbon monofluorides was 80% based on a mass balance study of the system. The major by-product, carbon tetrafluoride, was recovered in the U-trap and accounted for the remaining 20%. A 10% yield of the snow white carbon monofluoride of composition $CF_{1.19}$ was obtained. This white material was recovered in the particle trap was previously indicated.

An elemental analysis was performed on the snow white carbon monofluoride and the results were: C, 34.2; F, 64.75. Calculated empirical formula: $CF_{1.19 \pm 0.04}$.

Infrared spectra analyses were run on the super-stoichiometric samples and the data obtained consisted of a strong carbon-fluorine stretch at 1217 cm$^{-1}$ and two medium bands at 1342 and 1072 cm$^{-1}$ which are due to asymmetric and symmetric stretching vibrations of the peripheral $CF_2$ groups. A 3.32 cm$^{-1}$ far infrared band was observed and is due to bending in $CF_2$ groups.

X-ray powder patterns were done and produced nine lines. The observed "d" spacings (A) were 5.80 vs, br; 3.4 w; 2.85 diffuse, m; 2.55 w; 2.2–2.25 vs, br; 1.83 w; 171 w; 1.66 w; and 1.289 s.

EXAMPLE 2

The procedure of Example 1 was used except as follows. The fluorine flow was set at 10 cc. per minute and was combined with an argon flow of 10 cc. per minute. The plasma was generated by applying a 930 Watt, 20 mehahertz RF current across the coil. After 12 hours, 0.1 grams of white $CF_{1.14}$ were recovered from the top of the erlenmeyer flask, along with some brown and gray product.

EXAMPLE 3

The procedure of Example 1 was followed except as follows. A graphite rod, 9 inches long and one-fourth inch in diameter, was placed on the lower screen and used as a source of carbon. The fluorine flow was set at 30 cc/min and plasma was generated by applying a 600 Watt, 20 megahertz RF current across the coil. After 12 hours, 0.2 grams of white $CF_{1.17}$ were recovered.

EXAMPLE 4

The procedure of Example 1 was used except as follows. Fluorine plasma was generated by applying an 850 Watt, 7 megahertz RF current across the coil. The reaction was allowed to continue for 12 hours, after which time 0.2 grams of $CF_{1.17}$ were recovered. Gray and brown carbon monofluoride product were also produced.

EXAMPLE 5

The procedure of Example 1 was used except as follows. Fluorine flow was set at 50 cm/min and a fluorine plasma was generated by applying a 670 Watt, 12 megahertz RF current across the coil. After 12 hours, 0.23 grams of $CF_{1.16}$ were recovered.

What is claimed is:

1. A process for preparing carbon monofluoride comprising contacting a source of carbon with fluorine plasma.
2. A process of claim 1 wherein said fluorine plasma has a gas temperature of below about 640°C.
3. A process of claim 2 wherein said carbon comprises graphitized carbon.
4. A process of claim 3 wherein said fluorine plasma is formed by applying a radio frequency field across a flow of fluorine gas at a low pressure.
5. A process of claim 4 wherein said fluorine gas is mixed with an inert gas.
6. A process of claim 5 wherein said inert gas comprises argon.
7. A process of claim 6 wherein said fluorine plasma has a gas temperature of between about 100°C. and about 150°C.
8. A process of claim 7 wherein said source of carbon comprises graphite flakes.
9. A process for preparing carbon monofluoride, comprising:
    a. establishing a flow of fluorine gas;
    b. suspending a source of carbon in said flow of fluorine gas; and,
    c. applying an activating radio frequency field across said flow of fluorine gas to thereby create a fluorine plasma having a gas temperature of below 640°C.
10. A process of claim 9 wherein said carbon comprises finely divided carbon.
11. A process of claim 10 wherein said finely divided carbon comprises graphite flakes.
12. In a process for preparing carbon monofluoride by contacting a source of carbon with fluorine gas: the improvement comprising using fluorine plasma.

* * * * *